United States Patent
Matsumura et al.

(10) Patent No.: US 11,652,587 B2
(45) Date of Patent: May 16, 2023

(54) TERMINAL, RADIO COMMUNICATION METHOD, AND SYSTEM TO CONFIGURE A SEQUENCE FOR A REFERENCE SIGNAL

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 36 days.

(21) Appl. No.: 17/052,392

(22) PCT Filed: May 8, 2018

(86) PCT No.: PCT/JP2018/017844
§ 371 (c)(1),
(2) Date: Nov. 2, 2020

(87) PCT Pub. No.: WO2019/215822
PCT Pub. Date: Nov. 14, 2019

(65) Prior Publication Data
US 2021/0091904 A1    Mar. 25, 2021

(51) Int. Cl.
*H04L 5/00* (2006.01)

(52) U.S. Cl.
CPC .................... *H04L 5/0048* (2013.01)

(58) Field of Classification Search
CPC . H04L 27/2613; H04L 5/0012; H04L 5/0048; H04L 5/0051; H04L 5/0091; H04L 5/0016
See application file for complete search history.

(56) References Cited

U.S. PATENT DOCUMENTS

2015/0036525 A1* 2/2015 Aiba .................. H04W 72/121
370/252
2021/0014005 A1* 1/2021 Ying .................... H04L 1/1887

FOREIGN PATENT DOCUMENTS

WO    2013/044674 A1    4/2013

OTHER PUBLICATIONS

Qualcomm ("First Summary of Issues for PDSCH/PUSCH's DM-RS"; R1-1805611; 3GPP TSG RAN WG1 Meeting #92bis; Sanya, China, Apr. 16-20, 2018 (Year: 2018).*
3GPP TSG RAN WG1 Meeting AH 1801; R1-1801093 "Summary of Issues for PDSCH/PUSCH's DM-RS" Qualcomm; Vancouver, Canada; Jan. 22-26, 2018 (21 pages).

(Continued)

*Primary Examiner* — Melvin C Marcelo
*Assistant Examiner* — Natali Pascual Peguero
(74) *Attorney, Agent, or Firm* — Osha Bergman Watanabe & Burton LLP

(57) ABSTRACT

To appropriately configure a sequence to be applied to, for example, a reference signal in a future radio communication system, one aspect of a user terminal according to the present invention includes: a transmitting section that transmits an uplink shared channel and a Demodulation Reference Signal (DMRS) of the uplink shared channel; and a control section that controls a sequence to be applied to the DMRS based on at least one of a maximum length of the DMRS configured by a higher layer parameter, a number of symbols of the DMRS notified by downlink control information, and whether or not frequency hopping is applied.

3 Claims, 9 Drawing Sheets

(56) References Cited

OTHER PUBLICATIONS

3GPP TSG RAN WG1 Meeting #92bis; R1-1805611 "First Summary of Issues for PDSCH/PUSCH's DM-RS" Qualcomm; Sanya, China; Apr. 16-20, 2018 (18 pages).
3GPP TSG RAN WG1 Meeting #92; R1-1803323 "Summary of Issues for PDSCH/PUSCH's DM-RS" Qualcomm; Athens, Greece; Feb. 26-Mar. 2, 2018 (16 pages).
Extended European Search Report issued in European Application No. 18918239.7, dated Nov. 10, 2021 (7 pages).
International Search Report issued in PCT/JP2018/017844 dated Jul. 31, 2018 (2 pages).
Written Opinion of the International Searching Authority issued in PCT/JP2018/017844 dated Jul. 31, 2018 (4 pages).
Nokia, Nokia Shanghai Bell; "Further comments on DM-RS for NR physical data channels"; 3GPP TSG RAN WG1 Meeting 92bis, R1-1805109; Sanya, P R. China; Apr. 16-20, 2018 (8 pages).
NTT Docomo, Inc.; "Remaining details on DM-RS"; 3GPP TSG RAN WG1 Meeting #92, R1-1802476; Athens, Greece; Feb. 26-Mar. 2, 2018 (8 pages).
3GPP TS 38.211 V15.1.0; "3rd Generation Partnership Project; Technical Specification Group Radio Access Network NR; Physical channels and modulation (Release 15)"; Mar. 2018 (102 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action in counterpart Indian Patent Application No. 202037049759 dated Aug. 18, 2022 (6 pages).

\* cited by examiner

TERMINAL, RADIO COMMUNICATION METHOD, AND SYSTEM TO CONFIGURE A SEQUENCE FOR A REFERENCE SIGNAL

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE-Advanced (LTE-A), Future Radio Access (FRA), 4G, 5G, 5G+(plus), New RAT (NR), and LTE Rel. 14 and 15~) are also studied.

Legacy LTE systems (e.g., LTE Rel. 8 to 13) perform communication on Downlink (DL) and/or Uplink (UL) by using subframes (also referred to as, for example, Transmission Time Intervals (TTIs)) of 1 ms. The subframe is a transmission time unit of 1 channel-coded data packet, and is a processing unit of scheduling, link adaptation and retransmission control (HARQ: Hybrid Automatic Repeat reQuest).

Furthermore, in the legacy LTE systems (e.g., LTE Rel. 8 to 13), a user terminal transmits Uplink Control Information (UCI) by using an uplink control channel (e.g., PUCCH: Physical Uplink Control Channel) or an uplink data channel (e.g., PUSCH: Physical Uplink Shared Channel). A configuration (format) of the uplink control channel will be referred to as, for example, a PUCCH Format (PF).

Furthermore, in the legacy LTE systems, the user terminal multiplexes a UL channel and a DMRS in a TTI of 1 ms to transmit. A plurality of DMRSs of different layers of an identical user terminal (or different user terminals) are orthogonally multiplexed by using a Cyclic Shift (CS) and/or an orthogonal spreading code (e.g., OCC: Orthogonal Cover Code) in the TTI of 1 ms.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Legacy LTE systems (e.g., LTE Rel. 13 or prior releases) make a base sequence of a DMRS (DMRS sequence) for a UL channel hop (e.g., Sequence Group Hopping (SGH that will be also referred to simply as group hopping) or sequence hopping) every other two slots included in a subframe of 1 ms to reduce an inter-cell interference.

It is studied for future radio communication systems (e.g., LTE Rel. 14 and 15~, 5G and NR) to flexibly control allocation of an uplink shared channel in a symbol unit. For example, it is assumed to support UL transmission of each UE by using uplink shared channels whose, for example, allocation durations are different per slot. Furthermore, it is also studied for the future radio communication systems to control whether or not to apply frequency hopping in a slot.

Thus, how to control a sequence (or hopping of the sequence) to be applied to a DMRS for an uplink shared channel matters in the future radio communication systems that control communication by using a different configuration from those of the legacy LTE systems.

The present invention has been made in light of this point, and one of objects of the present invention is to provide a user terminal and a radio communication method that can appropriately configure a sequence to be applied to, for example, a reference signal in a future radio communication system.

Solution to Problem

One aspect of a user terminal according to the present invention includes: a transmitting section that transmits an uplink shared channel and a Demodulation Reference Signal (DMRS) of the uplink shared channel; and a control section that controls a sequence to be applied to the DMRS based on at least one of a maximum length of the DMRS configured by a higher layer parameter, a number of symbols of the DMRS notified by downlink control information, and whether or not frequency hopping is applied.

Advantageous Effects of Invention

According to the present invention, it is possible to appropriately configure a sequence to be applied to, for example, a reference signal in a future radio communication system.

DESCRIPTION OF EMBODIMENTS

Figure 1:
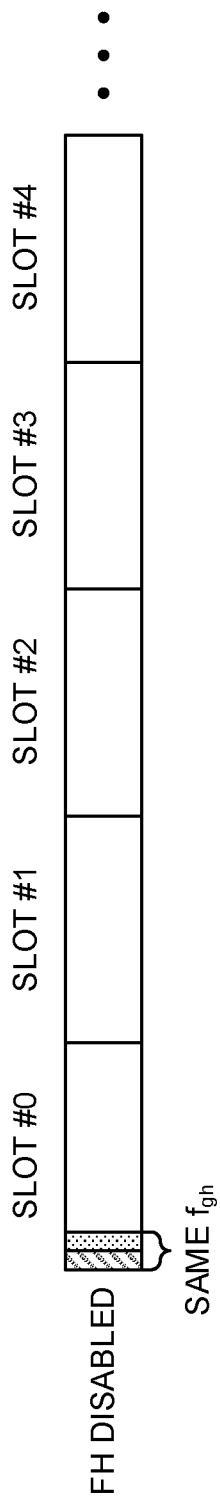
FIG. 1 is a diagram illustrating one example of a sequence to be applied to a DMRS.

According to legacy LTE systems (e.g., LTE Rel. 13 or prior releases), two slots are provided in a TTI of 1 ms.

Furthermore, a DMRS used to demodulate a PUSCH is arranged on 1 symbol of each slot (2 symbols in a TTI of 1 ms). For example, a sequence based on Zadoff-chu (ZC) is used as a DMRS base sequence (also referred to as, for example, DMRS sequence).

Furthermore, according to the legacy LTE systems, the number of DMRS sequences is configured to 30 or 60 according to a bandwidth. For example, the number of DMRS sequences is 30 when the bandwidth is 5 Physical Resource Blocks (also referred to as, for example, PRBs or Resource Blocks (RBs)) or less, and is 60 when the bandwidth is 6 PRBs or more.

Furthermore, according to the legacy LTE systems, when the bandwidth is 5 PRBs or less, the 30 DMRS sequences are identified based on a group number (u=0 to 29) (also referred to as, for example, a group index). Furthermore, when the bandwidth is 6 PRBs or more, the 60 DMRS sequences are identified based on a group number (u=0 to 29) and a base sequence number (v=0, 1) (also referred to as, for example, a sequence index).

When an identical DMRS sequence is used between a plurality of user terminals in different cells, transmission signals from a plurality of these respective user terminals interfere. Hence, to avoid that DMRS sequences become contiguous and identical between a plurality of these user terminals, the DMRS sequences are hopped per slot in a TTI of 1 ms. For example, the legacy LTE systems use 2 types of hopping methods (sequence group hopping and sequence hopping).

According to Sequence Group Hopping (SGH that will be also referred to simply as group hopping), the above-described group number (u) is hopped in a slot unit in the TTI of 1 ms. According to SGH, the group number (u) of each slot is determined based on a hopping pattern ($f_{gh}$) and a sequence shift pattern ($f_{ss}$). $f_{gh}$ may be referred to as group hopping or a group hopping parameter.

The hopping pattern and/or the sequence shift pattern may be based on a physical cell ID (cell ID) or a virtual cell ID. A user terminal may grasp a physical cell ID based on a sequence number of a synchronization signal (PSS/SSS), and the virtual cell ID by an RRC signaling. In addition, the legacy LTE systems use, for example, 17 hopping patterns and 30 sequence shift patterns.

On the other hand, according to sequence hopping, the above-described base sequence number (v) is hopped in a slot unit in 1 TTI. The base sequence number (v) of each slot is determined based on a physical cell ID or a virtual cell ID. Sequence hopping is applied to a case where the bandwidth is 6 PRBs or more, and is not used in combination with SGH (v=0 is configured when SGH is applied).

As described above, the legacy LTE systems randomize an inter-cell interference, and consequently can apply SGH or sequence hopping to DMRS sequences.

It is studied for a future radio communication system (also referred to as NR below) to transmit, for example, data by using scheduling in a symbol unit (or a mini slot unit). For example, it is assumed to flexibly configure the number of allocation symbols (also referred to as a PUSCH length) of a physical shared channel (e.g., PUSCH), and control transmission of data.

Furthermore, NR supports Frequency Hopping (also referred to as FH) for a PUSCH. Frequency hopping includes Intra-slot Frequency Hopping (Intra-FH) and Inter-slot Frequency Hopping (Inter-FH). When, for example, intra-slot FH is applied (enable is configured), the UE hops a PUSCH to a different frequency domain in a slot. On the other hand, when intra-slot FH is not applied (disable is configured), the UE does not apply frequency hopping in the slot, and controls PUSCH transmission.

When transmitting the PUSCH, the UE transmits a Demodulation Reference Signal (DMRS), too, that is used to demodulate the PUSCH (or UL data). NR schedules the PUSCH in a symbol unit, and supports intra-slot FH, too, and therefore it is considered to flexibly control allocation of a DMRS (e.g., at least one of allocation positions and the number of allocation symbols) according to allocation of the PUSCH.

Thus, how to control a sequence to be applied to a DMRS (e.g., generation of a base sequence) in a configuration where allocation of the DMRS is flexibly controlled matters.

The inventors of the present invention have focused upon that, according to NR, allocation of a DMRS is controlled based on at least on a maximum length of the DMRS configured by a higher layer parameter, the number of symbols of the DMRS notified by downlink control information, and whether or not frequency hopping is applied. Hence, the inventors of the present invention have conceived controlling a sequence to be applied to a DMRS based on at least one of the maximum length of the DMRS, the number of symbols of the DMRS, and whether or not frequency hopping is applied as one aspect of the present invention.

Furthermore, the inventors of the present invention have focused on that a DMRS is configured to a plurality of symbols (e.g., 2 symbols) according to a PUSCH allocation configuration, and conceived applying an identical sequence to the two DMRS symbols.

Consequently, even when an OCC in a time domain is applied to neighboring DMRS symbols, it is possible to maintain orthogonality. This is because it is necessary to make a base sequence identical (apply the same base sequence) within a range of an identical OCC length from a viewpoint to maintain the orthogonality.

The present embodiment will be described in detail below. The embodiment described below may be applied alone, or may be applied in combination. The present embodiment will describe an example where a given sequence is a sequence to be applied to a DMRS for a PUSCH, yet is not limited to this. The given sequence may be applied to at least one of other UL signals, UL channels, DL signals and DL channels. Furthermore, the given sequence may be referred to as a base sequence, a reference signal sequence or a demodulation reference signal sequence.

Furthermore, according to the present embodiment, hopping of the given sequence may be at least one of hopping (also referred to as, for example, Sequence Group Hopping (SGH) or group hopping) of a group number of the given sequence, and hopping (also referred to as, for example, sequence hopping) of a base sequence number of the given sequence.

Furthermore, a method (e.g., equation) for generating a base sequence (or a DMRS sequence) according to the legacy LTE systems may be applied to matters such as generation of the given sequence that are not mentioned in particular in the following description.

(Sequence Control of DMRS)

When a DMRS is arranged on a plurality of symbols (e.g., 2 symbols of a first symbol and a second symbol) in a given duration (e.g., slot), the same given sequence is applied to the first DMRS symbol and the second DMRS symbol. The UE determines the given sequence to be applied to the second DMRS symbol based on the first DMRS symbol (selects the same sequence as that of the first DMRS symbol).

In this regard, it is assumed that NR supports for UL transmission (e.g., PUSCH transmission) a Discrete Fourier Transform-Spread-Orthogonal Frequency Division Multiplexing (DFT-s-OFDM) waveform that is a single carrier waveform, and a Cyclic Prefix-Orthogonal Frequency Division Multiplexing (CP-OFDM) waveform that is a multi-carrier waveform.

The DFT-spread-OFDM waveform can be paraphrased as a UL signal to which DFT-spreading (also referred to as, for example, DFT-precoding) is applied (with DFT-spreading), and the CP-OFDM waveform may be paraphrased as, for example, a UL signal to which DFT-spreading is not applied (without DFT-spreading).

The DFT-spread-OFDM waveform (also described as a first waveform below) is a single carrier waveform, so that it is possible to prevent an increase in a Peak to Average Power Ratio (PAPR). Furthermore, application of the DFT-spread-OFDM waveform is limited to Physical Resource Blocks (PRBs) to which uplink data (PUSCH) is contiguously allocated.

It is assumed that whether or not to apply DFT-spreading (the DFT-spread-OFDM waveform (also described as the first waveform below) or the CP-OFDM waveform (also described as the second waveform below)) to UL transmission (e.g., PUSCH) is configured or indicated from a network (e.g., radio base station) to the user terminal.

For example, the base station configures whether or not to apply the first waveform, to the user terminal by using a higher layer signaling and/or downlink control information. Configuring a waveform will be also referred to as transform-precoding. When transform-precoding is "enabled", the UE applies the first waveform (DFT-spread-OFDM waveform) to transmit the PUSCH. On the other hand, when transform-precoding is "disabled", the UE transmits the PUSCH without applying the first waveform (by applying, for example, the CP-OFDM waveform).

The method for generating a sequence of a reference signal (e.g., DMRS) is defined differently between a case where transform-precoding is enabled for a PUSCH and a case where transform-precoding is disabled.

When, for example, transform-precoding is enabled, a DMRS sequence (also referred to as, for example, r(n)) may be defined by using, for example, the sequence group (u) and the sequence number (v). Furthermore, the sequence group (u) may be defined based on, for example, $f_{gh}$ corresponding to group hopping (or a group hopping parameter). Furthermore, application of group hopping and sequence hopping is supported.

On the other hand, when transform-precoding is disabled, the DMRS sequence (also referred to as, for example, r(n)) may be defined based on, for example, a pseudo-random sequence and an initial value ($c_{init}$) of the pseudo-random sequence without using the sequence group (u) and the sequence number (v).

According to the present embodiment, a sequence to be applied to a DMRS is controlled by respectively different methods between a case where transform-precoding is enabled (applied) and a case where transform-precoding is disabled (is not applied). DMRS sequences in a case where transform-precoding is enabled and a case where transform-precoding is disabled will be respectively described below.

<Transform-Precoding is Enabled>

It is assumed that transform-precoding is configured to enabled (e.g., a case where PUSCH transmission based on DFT-s-OFDM is performed), and group hopping or sequence hopping is applied. In this case, a sequence to be applied to a DMRS is controlled based on at least one of a maximum length of the DMRS, the number of symbols of the DMRS, and whether or not frequency hopping is applied.

When, for example, group hopping is applied and sequence hopping is not applied, the parameter $f_{gh}$ and the sequence number (v) related to group hopping may be defined by following equation (1).

[Mathematical 1]

$$f_{gh} = (\Sigma_{m=0}^{7} 2^m c(8(N_{symb}^{slot} n_{s,f}^{\mu} + l) + m)) \bmod 30$$

$$v = 0 \qquad \text{Equation (1)}$$

c(i): Function of pseudo-random sequence
m: Value corresponding to mth bit of c(i) including 0 and 1 of 8 bits (m=0 to 7)
$N_{symb}^{slot}$: The number of symbols per slot
$n_{s,f}^{\mu}$: Slot number
l: Symbol number in slot In equation (1), l (quantity l) corresponds to an OFDM symbol number in a case where a double-symbol DMRS is not applied. When the double-symbol DMRS is applied, l corresponds to an OFDM symbol number associated with a first symbol of the double-symbol DMRS.

Thus, when group hopping is performed, $f_{gh}$ to be applied to the DMRS is determined based on, for example, the symbol number. In addition, an initial value ($n_{init}$) of the pseudo-random sequence in equation (1) is determined based on a value (e.g., $n_{ID}^{PUSCH}$) notified by a higher layer signaling, or a value (e.g., $n_{ID}^{cell}$) associated with a cell ID.

When configurations of the PUSCH and the DMRS satisfy given conditions, the DMRS is mapped on the first symbol (also referred to as the first DMRS symbol) and the second symbol (also referred to as the second DMRS symbol). The first DMRS symbol may be at least a head symbol (or a head symbol of a slot) of PUSCH (or slot) transmission. Furthermore, the second DMRS symbol may be a neighboring symbol of the first DMRS symbol.

The given conditions may be that, for example, a higher layer parameter (e.g., UL-DMRS-max-len) for giving notification of the maximum length of the DMRS is configured to 2, frequency hopping is not applied (disabled), and the number of front-load symbols is configured to (or notified as) 2 by given DCI.

The given DCI (that may be referred to as associated DCI) may be DCI for scheduling a PUSCH. For example, the base station may notify the UE of the number of front-load symbols (e.g., which one of 1 and 2 the number of front-load symbols is) associated with an antenna port by using the given DCI. The number of front-load symbols corresponds to the number of symbols (1 or 2 symbols from the head) on which the DMRS is arranged in a head domain of the PUSCH (or the slot).

Alternatively, the given conditions may be whether or not a double-symbol DMRS is applied. When, for example, the higher layer parameter (UL-DMRS-max-len) is configured to 2, and frequency hopping is not applied (disabled), the base station notifies the UE of which one of a single-symbol DMRS and the double-symbol DMRS is used by using the given DCI.

The single-symbol DMRS may employ a configuration where the DMRS is arranged on 1 symbol (e.g., a time index l'=0 of the DMRS for the PUSCH). On the other hand, the double-symbol DMRS may employ a configuration where the DMRS is arranged on 2 symbols (e.g., a time index l'=0, 1 of the DMRS for the PUSCH). By using the double-symbol configuration, it is possible to improve channel estimation accuracy.

When an OCC of a time domain is applied to the first DMRS symbol and the second DMRS symbol, if group hopping is applied based on a symbol level (e.g., a symbol unit or a symbol number), it is not possible to maintain orthogonality of the OCC. Hence, from a viewpoint to maintain the orthogonality of the OCC, it is effective to apply identical $f_{gh}$ to the neighboring first DMRS symbol and second DMRS symbol.

Hence, when the given conditions are satisfied, the UE determines $f_{gh}$ of the second DMRS symbol based on the first DMRS symbol. For example, the UE may apply, to the second DMRS symbol, same $f_{gh}$ as $f_{gh}$ to be applied to the first DMRS symbol (see FIG. 1).

FIG. 1 illustrates a case where the first DMRS symbol and the second DMRS symbol are arranged on neighboring symbols in the time direction. In addition, a time domain (PUSCH symbol length) in which the PUSCH is transmitted in a slot #0 may be notified from the base station to the UE. Furthermore, $f_{gh}$ to be applied to the first DMRS symbol may be determined by using above equation (1).

Thus, by using one (same) $f_{gh}$ for a DMRS arranged in a given slot, it is possible to apply an OCC length of the time domain to the DMRS. By applying same $f_{gh}$ (or the same group number) to a DMRS arranged on different symbols, it is possible to maintain orthogonality of the OCC of the time domain for the DMRS, so that it is possible to increase a multiplexing capacity of the UE.

Furthermore, when group hopping is not applied (disabled), and sequence hopping is applied, the parameter $f_{gh}$ and the sequence number (v) related to group hopping may be defined by following equation (2).

[Mathematical 2]

$$f_{gh} = 0 \qquad \text{Equation (2)}$$

$$v = \begin{cases} c(N_{symb}^{slot} n_{s,f}^{\mu} + l) & \text{if } M_{ZC} \geq 6 N_{sc}^{RB} \\ 0 & \text{otherwise} \end{cases}$$

c(i): Function of pseudo-random sequence
$N_{symb}^{slot}$: The number of symbols per slot
$n_{s,f}^{\mu}$: Slot number
l: Symbol number in slot
$M_{zc}$: Sequence length
$N_{sc}^{RB}$: The number of subcarriers per RB.

In equation (2), l (quantity l) corresponds to an OFDM symbol number in a case where a double-symbol DMRS is not applied. When the double-symbol DMRS is applied, l corresponds to an OFDM symbol associated with a first symbol of the double-symbol DMRS.

Thus, when sequence hopping is performed, the sequence number (v) to be applied to the DMRS is determined based on, for example, the symbol number. In addition, an initial value ($n_{init}$) of the pseudo-random sequence in equation (2) is determined based on a value (e.g., $n_{ID}^{PUSCH}$) notified by a higher layer signaling, or a value (e.g., $n_{ID}^{cell}$) associated with a cell ID.

When configurations of the PUSCH and the DMRS satisfy the given conditions, the DMRS is mapped on the first DMRS symbol and the second DMRS symbol. The first DMRS symbol may be at least a head symbol of a PUSCH (or a slot). Furthermore, the second DMRS symbol may be a neighboring symbol of the first DMRS symbol, or may be a symbol arranged at another position.

The given conditions may be that, for example, the higher layer parameter (e.g., UL-DMRS-max-len) is configured to 2, frequency hopping is not applied (disabled), and the number of front-load symbols is configured to (or notified as) 2 by given DCI.

The given DCI (that may be referred to as associated DCI) may be DCI for scheduling a PUSCH. For example, the base station may notify the UE of the number of front-load symbols (e.g., which one of 1 and 2 the number of front-load symbols is) associated with an antenna port by using the given DCI. The number of front-load symbols corresponds to the number of symbols (1 or 2 symbols from the head) on which the DMRS is arranged in a head domain of the PUSCH (or the slot).

Alternatively, the given conditions may be whether or not the double-symbol DMRS is applied. When, for example, the higher layer parameter (UL-DMRS-max-len) is configured to 2, and frequency hopping is not applied (disabled), the base station notifies the UE of which one of the single-symbol DMRS and the double-symbol DMRS is used by using the given DCI.

For example, the single-symbol DMRS may employ a configuration where the DMRS is arranged on 1 symbol (e.g., a time index l'=0 of the DMRS for the PUSCH). On the other hand, the double-symbol DMRS may employ a configuration where the DMRS is arranged on 2 symbols (e.g., a time index l'=0, 1 of the DMRS for the PUSCH).

When the OCC of the time domain is applied to the first DMRS symbol and the second DMRS symbol, if sequence hopping is applied based on a symbol level, it is not possible to maintain orthogonality of the OCC. Hence, from a viewpoint to maintain the orthogonality of the OCC, it is effective to apply the identical sequence number (v) to the neighboring first DMRS symbol and second DMRS symbol.

Hence, when the given conditions are satisfied, the UE determines the sequence number (v) of the second DMRS symbol based on the first DMRS symbol. For example, the UE may apply, to the second DMRS symbol, the same sequence number (v) as the sequence number (v) to be applied to the first DMRS symbol (see FIG. 2).

Figure 2:
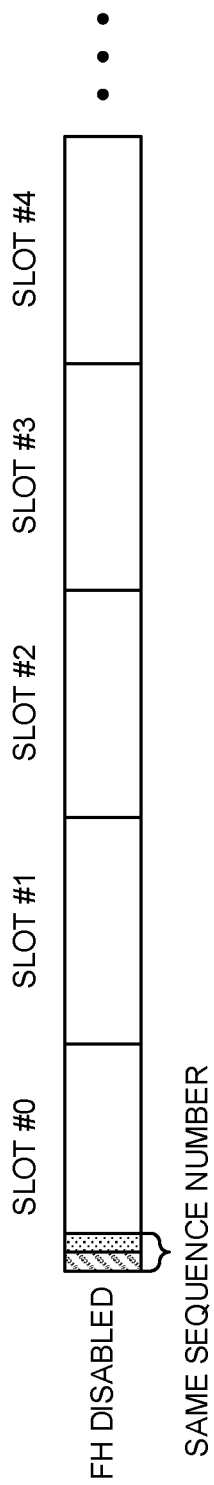
FIG. 2 is a diagram illustrating another example of a sequence to be applied to a DMRS.

FIG. 2 illustrates a case where the first DMRS symbol and the second DMRS symbol are arranged on neighboring symbols in the time direction. In addition, the time domain (PUSCH symbol length) in which the PUSCH is transmitted in the slot #0 may be notified from the base station to the UE. Furthermore, the sequence number (v) to be applied to the first DMRS symbol may be determined by using above equation (2).

Thus, when the DMRS is arranged on 2 symbols, it is possible to maintain orthogonality of the OCC by applying same $f_{gh}$ or the same sequence number (v) even when the OCC is applied to the DMRS to be arranged on the 2 symbols.

<Transform-Precoding is Disabled>

It is assumed that transform-precoding is configured to disabled (e.g., PUSCH transmission based on CP-OFDM is performed). In this case, a sequence to be applied to a DMRS is controlled based on at least one of a maximum length of the DMRS, the number of symbols of the DMRS, and whether or not frequency hopping is applied.

When, for example, transform-precoding is configured to disabled, the sequence to be applied to the DMRS may be generated by following equation (3).

[Mathematical 3]

$$r(n) = \frac{1}{\sqrt{2}}(1 - 2 \cdot c(2n)) + j\frac{1}{\sqrt{2}}(1 - 2 \cdot c(2n+1)) \quad \text{Equation (3)}$$

c(i): Function of pseudo-random sequence
j: Imaginary number

In this case, the parameter l related to a symbol is included as a parameter included for determination of an initial value, and therefore the sequence is generated based on a symbol level. In addition, an initial value ($c_{init}$) of the pseudo-random sequence in equation (3) may be defined by following equation (4).

[Mathematical 4]

$$c_{init} = (2^{17}(N_{symb}^{slot} n_{s,f}^{\mu} + l + 1)(2N_{ID}^{nSCID} + 1) + 2N_{ID}^{nSCID} + n_{SCID}) \bmod 2^{31} \quad \text{Equation (4)}$$

$N_{symb}^{slot}$: The number of symbols per slot
$n_{s,f}^{\mu}$: Slot number
l: Symbol number in slot
$n_{SCID}$: Value notified by higher layer (e.g., $n_{SCID} \in \{0,1\}$)
$N_{ID}^{n\_SCID}$: Value notified by higher layer (e.g., $N_{ID}^{nSCID} \in \{0, 1, \ldots, 65535\}$)

In equation (4), l (quantity l) corresponds to an OFDM symbol number in a case where a double-symbol DMRS is not applied. When the double-symbol DMRS is applied, l corresponds to an OFDM symbol associated with a first symbol of the double-symbol DMRS.

When configurations of the PUSCH and the DMRS satisfy given conditions, the DMRS is mapped on the first DMRS symbol and the second DMRS symbol. The first DMRS symbol may be at least a head symbol of a PUSCH (or a slot). Furthermore, the second DMRS symbol may be a neighboring symbol of the first DMRS symbol, or may be a symbol arranged at another position.

The given conditions may be that, for example, the higher layer parameter (e.g., UL-DMRS-max-len) is configured to 2, frequency hopping is not applied (disabled), and the number of front-load symbols is configured to (or notified as) 2 by given DCI.

The given DCI (that may be referred to as associated DCI) may be DCI for scheduling a PUSCH. For example, the base station may notify the UE of the number of front-load symbols (e.g., which one of 1 and 2 the number of front-load symbols is) associated with an antenna port by using the given DCI. The number of front-load symbols corresponds to the number of symbols (1 or 2 symbols from the head) on which the DMRS is arranged in a head domain of the PUSCH (or the slot).

Alternatively, the given conditions may be whether or not the double-symbol DMRS is applied. When, for example, the higher layer parameter (UL-DMRS-max-len) is configured to 2, and frequency hopping is not applied (disabled), the base station notifies the UE of which one of the single-symbol DMRS and the double-symbol DMRS is used by using the given DCI.

For example, the single-symbol DMRS may employ a configuration where the DMRS is arranged on 1 symbol (e.g., a time index l'=0 of the DMRS for the PUSCH). On the other hand, the double-symbol DMRS may employ a configuration where the DMRS is arranged on 2 symbols (e.g., a time index l'=0, 1 of the DMRS for the PUSCH).

Taking into account application of the OCC to the first DMRS symbol and the second DMRS symbol, it is effective to apply the identical pseudo-random sequence c(i) (or the identical initial value ($c_{init}$)) to the neighboring first DMRS symbol and second DMRS symbol from a viewpoint to maintain orthogonality of the OCC.

Hence, when the given conditions are satisfied, the UE determines the pseudo-random sequence c(i) (or the initial value ($c_{init}$)) of the second DMRS symbol based on the first DMRS symbol. For example, the UE may apply, to the second DMRS symbol, the same value as that of the pseudo-random sequence c(i) (or the initial value ($c_{init}$)) to be applied to the first DMRS symbol (see FIG. 3).

Figure 3:
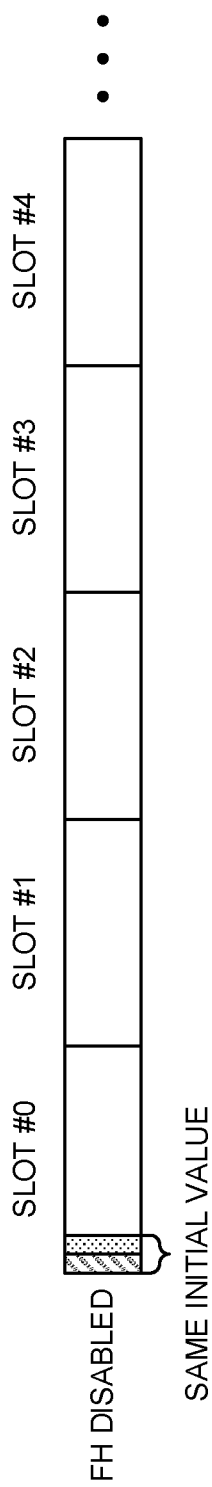
FIG. 3 is a diagram illustrating another example of a sequence to be applied to a DMRS.

FIG. 3 illustrates a case where the first DMRS symbol and the second DMRS symbol are arranged on neighboring symbols in the time direction. In addition, the time domain (PUSCH symbol length) in which the PUSCH is transmitted in the slot #0 may be notified from the base station to the UE. Furthermore, the pseudo-random sequence c(i) to be applied to the first DMRS symbol may be determined by using above equation (3). The initial value ($c_{init}$) may be determined by using above equation (4).

Thus, when the DMRS is arranged on 2 symbols, it is possible to maintain the orthogonality of the OCC by applying the same the pseudo-random sequence c(i) (or the same initial value ($c_{init}$)) even when the OCC is applied to the DMRS to be arranged on the 2 symbols.

(Radio Communication System)

The configuration of the radio communication system according to one embodiment of the present invention will be described below. This radio communication system uses one or a combination of the radio communication method according to each of the above embodiment of the present invention to perform communication.

Figure 4:
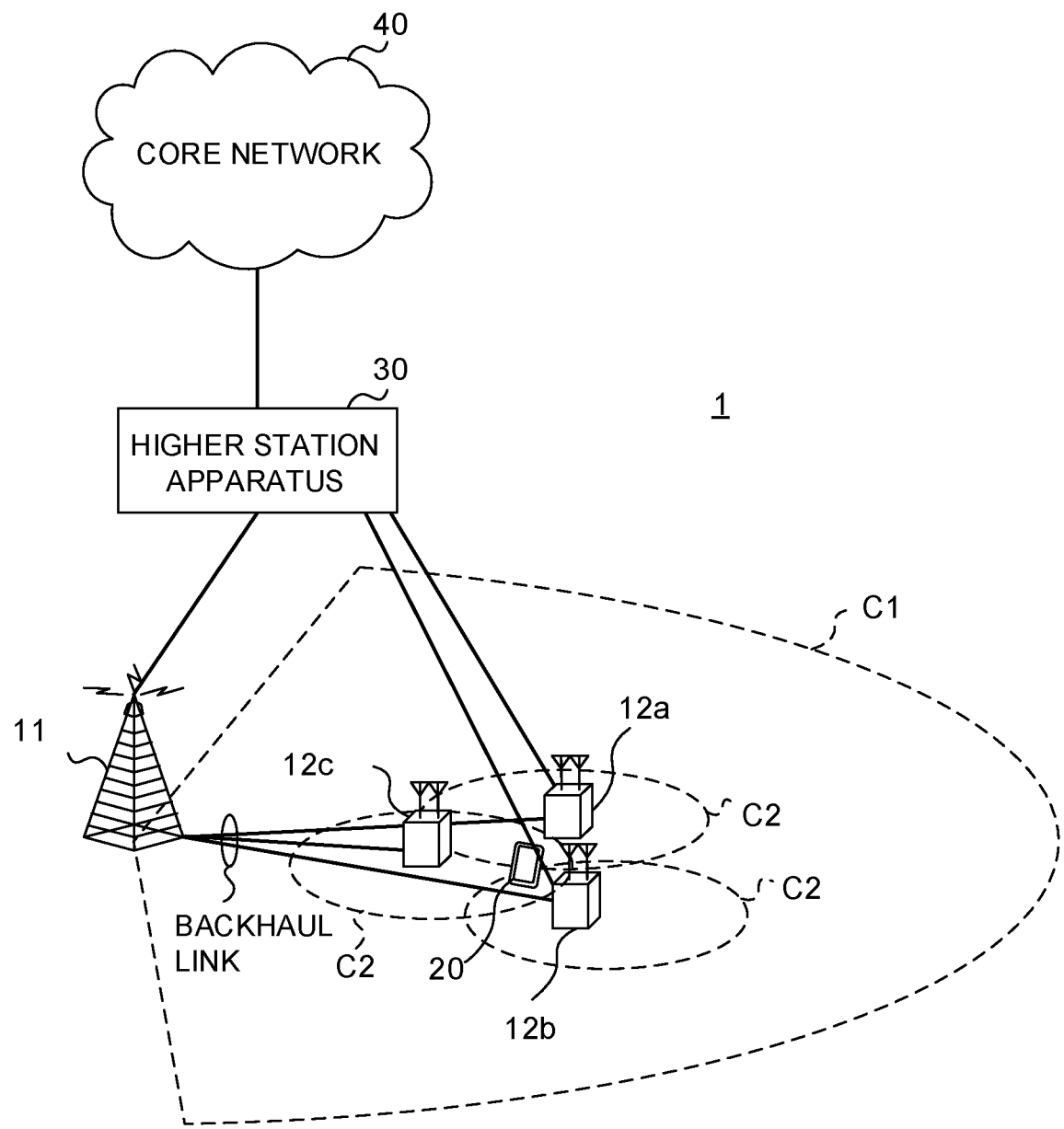
FIG. 4 is a diagram illustrating one example of a schematic configuration of a radio communication system according to the present embodiment.

FIG. 4 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, TMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to those illustrated in FIG. 4.

The user terminal 20 can connect with both of the radio base station 11 and the radio base stations 12. The user terminal 20 is assumed to concurrently use the macro cell C1 and the small cells C2 by CA or DC. Furthermore, the user terminal 20 may apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) may be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and a System Information Block (SIB) are conveyed on the PDSCH. Furthermore, a Master Information Block (MIB) is conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific reference signal). Furthermore, a reference signal to be conveyed is not limited to these.

<Radio Base Station>

Figure 5:
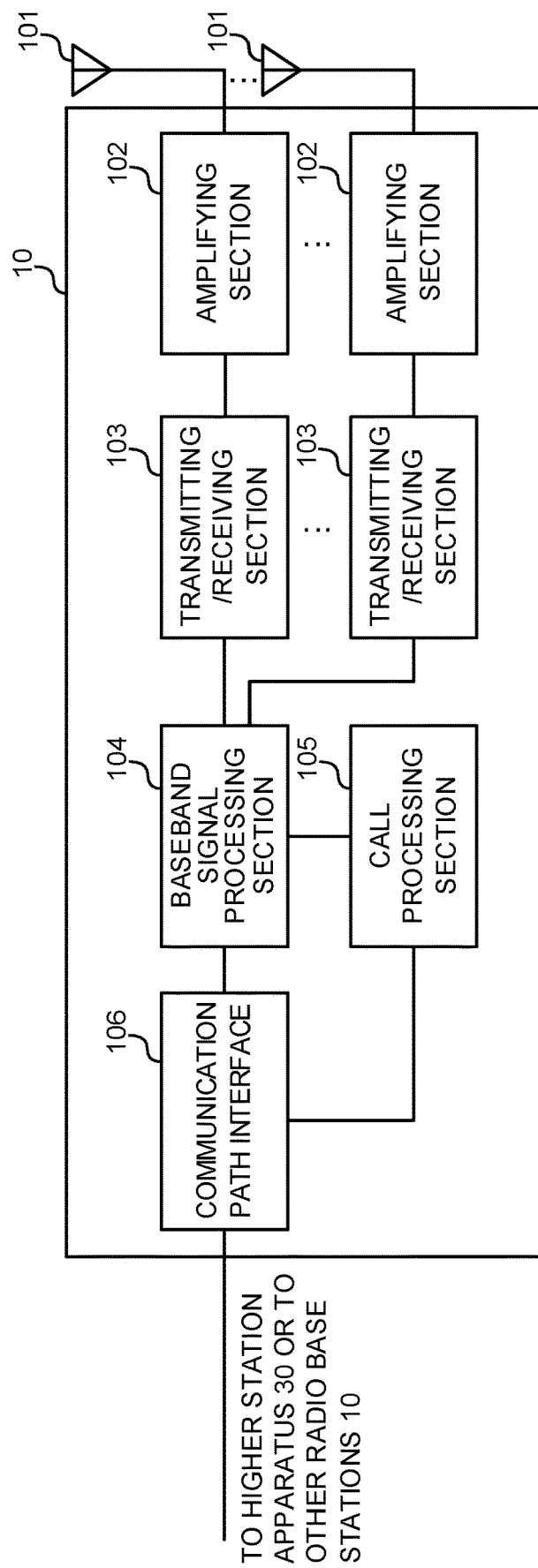
FIG. 5 is a diagram illustrating one example of an overall configuration of a radio base station according to the present embodiment.

FIG. 5 is a diagram illustrating one example of an overall configuration of the radio base station according to the one embodiment of the present invention. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10 and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Furthermore, each transmitting/receiving section 103 receives, for example, a demodulation reference signal for a UL channel to which a given sequence has been applied, and a PUSCH. Furthermore, each transmitting/receiving section 103 may give notification of at least one of whether or not a given group hopping pattern is applied (enabled or disabled) and a maximum length of a DMRS (e.g., UL-DMRS-max-len) by a higher layer signaling (e.g., a cell-specific and/or UE-specific RRC signaling (RRC parameter) or a broadcast signal). Furthermore, each transmitting/receiving section 103 may give notification of at least one of information related to the number of front-load symbols, and information related to which one of a single-symbol DMRS and a double-symbol DMRS is applied, by downlink control information.

Figure 6:
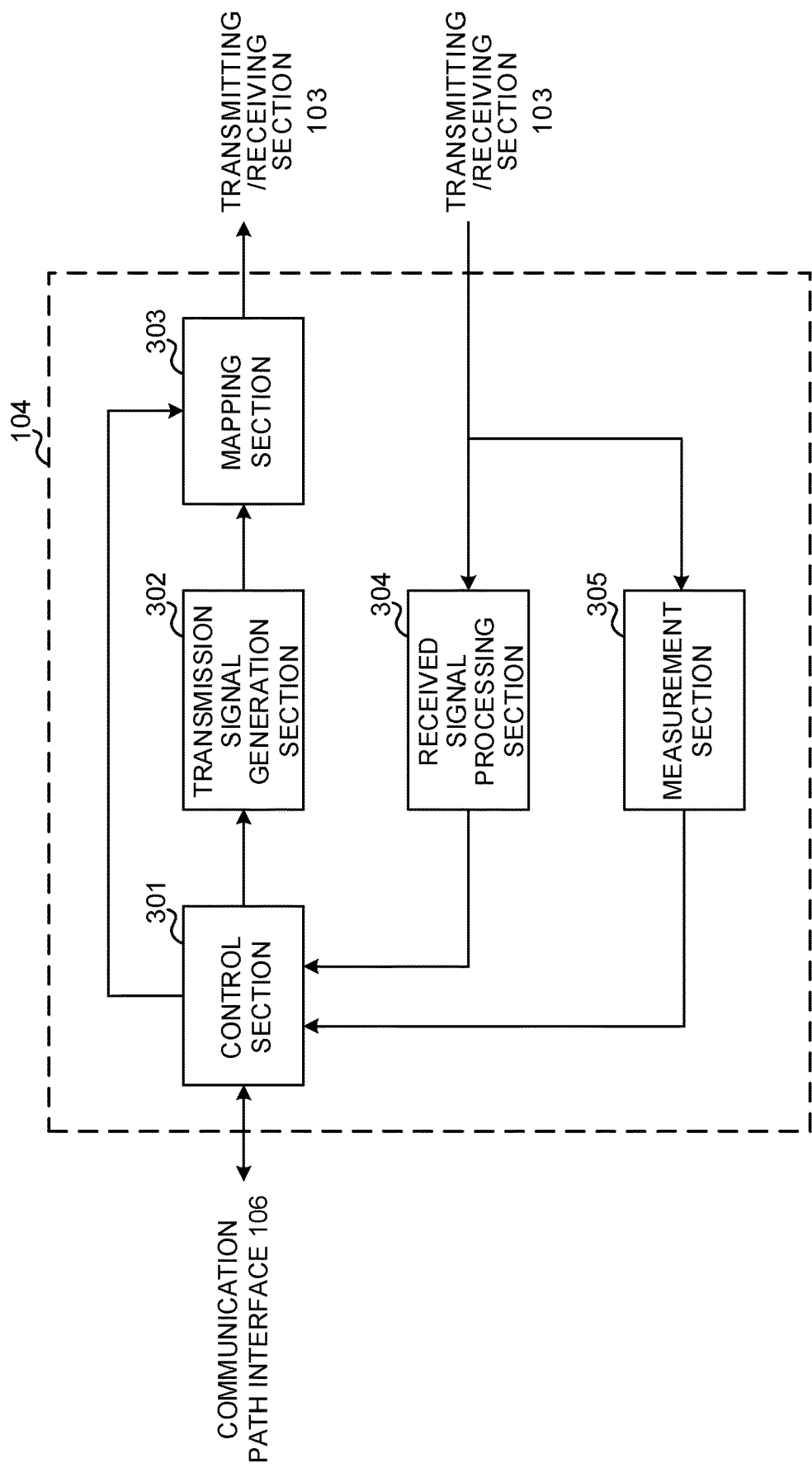
FIG. 6 is a diagram illustrating one example of a function configuration of the radio base station according to the present embodiment.

FIG. 6 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal that is transmitted on the PUSCH), an uplink control signal (e.g., a signal that is transmitted on a PUCCH and/or a PUSCH and is, for example, transmission acknowledgement information), a random access preamble (e.g., a signal that is transmitted on a PRACH) and an uplink reference signal.

Furthermore, the control section 301 controls at least one of a maximum length of the DMRS configured by the higher layer parameter, the number of symbols of the DMRS notified by the downlink control information, and whether or not frequency hopping is applied.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for giving notification of downlink data allocation information, and/or a UL grant for giving notification of uplink data allocation information based on the instruction from the control section 301. The DL assignment and the UL grant are both DCI, and conform to a DCI format. Furthermore, the transmission signal generating section 302 performs encoding processing and modulation processing on the downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ) or a Signal to Interference plus Noise Ratio (SINR)), a signal strength (e.g., a Received Signal Strength Indicator (RSSI)) or channel information (e.g., CSI). The measurement section 305 may output a measurement result to the control section 301.

<User Terminal>

Figure 7:
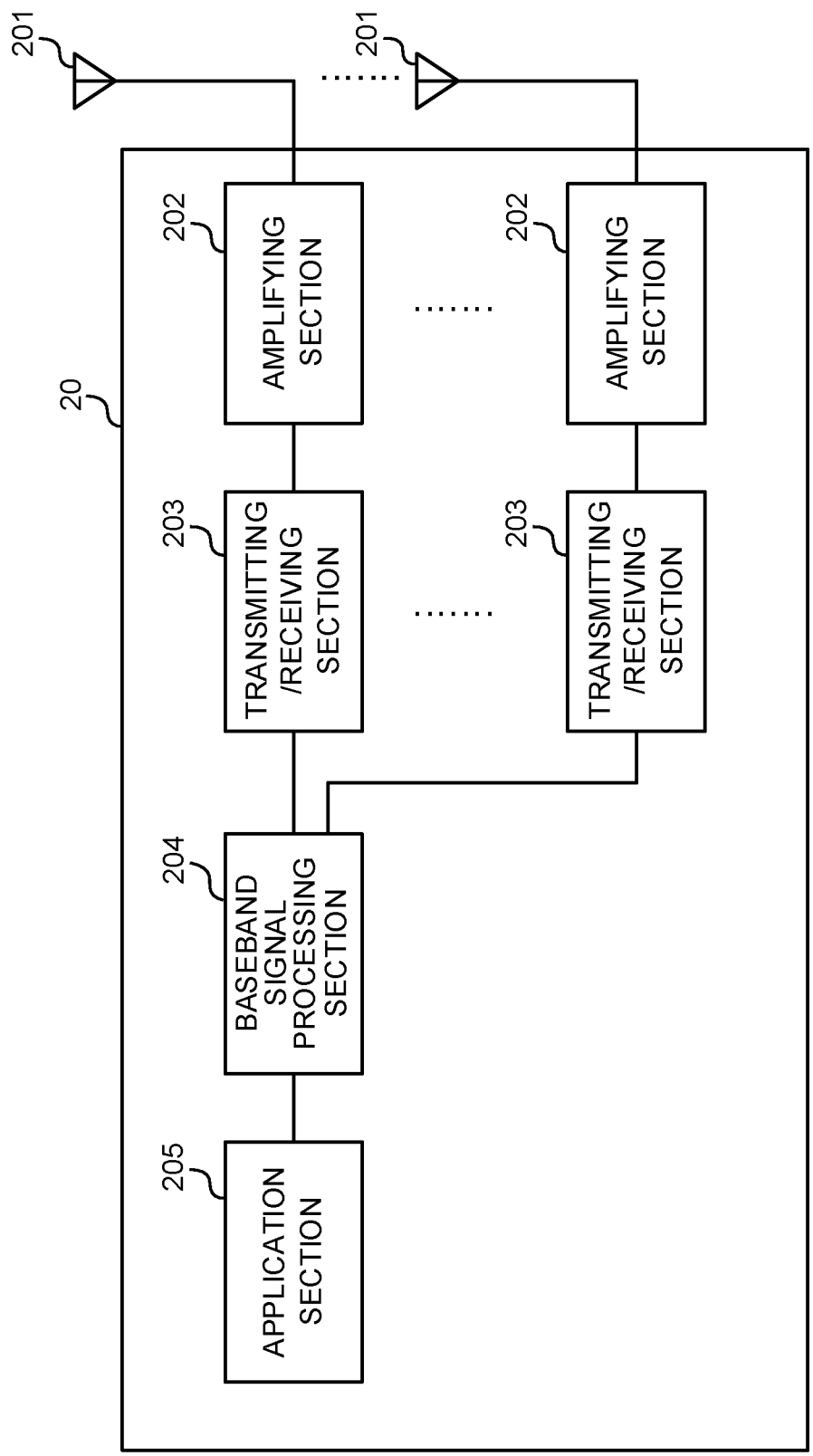
FIG. 7 is a diagram illustrating one example of an overall configuration of a user terminal according to the present embodiment.

FIG. 7 is a diagram illustrating one example of an overall configuration of the user terminal according to the one embodiment of the present invention. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present invention. In this regard, the transmitting/receiving sections 203 may be composed as an integrated transmitting/receiving section or may be composed of transmitting sections and receiving sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203. Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Furthermore, each transmitting/receiving section 203 transmits, for example, the demodulation reference signal for the UL channel to which the given sequence has been applied, and the PUSCH. Furthermore, each transmitting/receiving section 203 may receive at least one of whether or not a given group hopping pattern is applied (enabled or disabled), and the maximum length of the DMRS (e.g., UL-DMRS-max-len) by a higher layer signaling (e.g., a cell-specific and/or UE-specific RRC signaling (RRC parameter) or a broadcast signal). Furthermore, each transmitting/receiving section 203 may receive at least one of information related to the number of front-load symbols, and information related to which one of a single-symbol DMRS and a double-symbol DMRS is applied, by the downlink control information.

Figure 8:
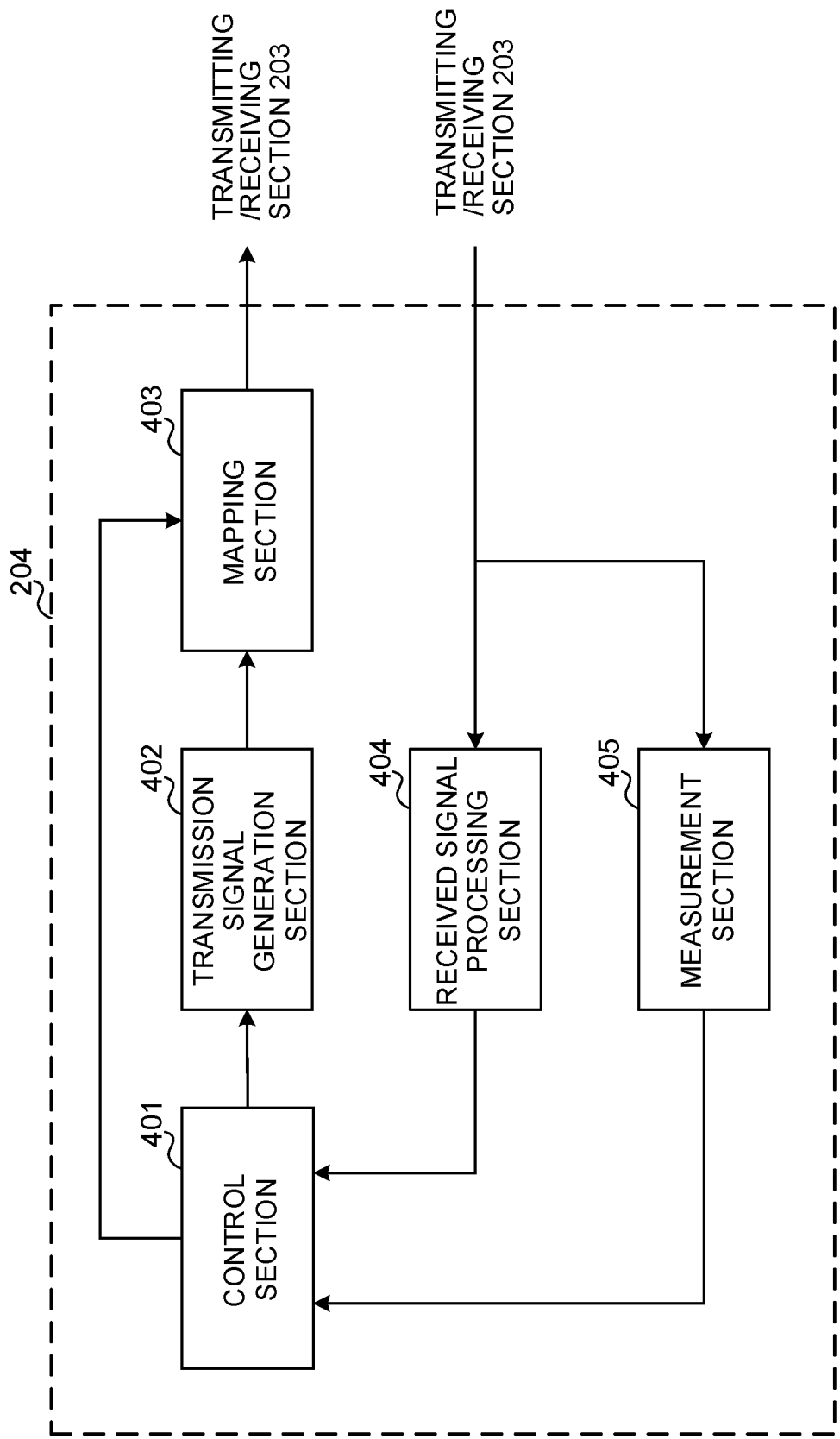
FIG. 8 is a diagram illustrating one example of a function configuration of the user terminal according to the present embodiment.

FIG. 8 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

Furthermore, the control section 401 controls a sequence to be applied to a DMRS based on at least one of the maximum length of the DMRS configured by the higher layer parameter, the number of symbols of the DMRS notified by the downlink control information, and whether or not frequency hopping is applied.

When, for example, transform-precoding is configured to enabled, and group hopping or sequence hopping is applied, the control section 401 applies a parameter or a sequence number of identical group hopping to a DMRS to be arranged on neighboring symbols in a configuration where frequency hopping is not applied and the DMRS is arranged on two neighboring symbols.

Alternatively, when transform-precoding is configured to enabled, and group hopping or sequence hopping is applied, the control section 401 may apply a parameter or a sequence number of identical group hopping to two DMRS symbols in a configuration where double symbols are applied to the DMRS.

Furthermore, when transform-precoding is configured to disabled, the control section 401 may apply at least one of an identical pseudo-random sequence and initial value to a DMRS to be arranged on neighboring symbols in a configuration where frequency hopping is not applied and the DMRS is arranged on two neighboring symbols.

Alternatively, when transform-precoding is configured to disabled, the control section 401 may apply at least one of the identical pseudo-random sequence and initial value to two DMRS symbols in a configuration where double symbols are applied to the DMRS.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates, for example, an uplink control signal related to transmission acknowledgement information and Channel State Information (CSI) based on the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the receiving section according to the present invention.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ or an SINR), a signal strength (e.g., RSSI) or channel information (e.g., CSI). The measurement section 405 may output a measurement result to the control section 401.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 9:
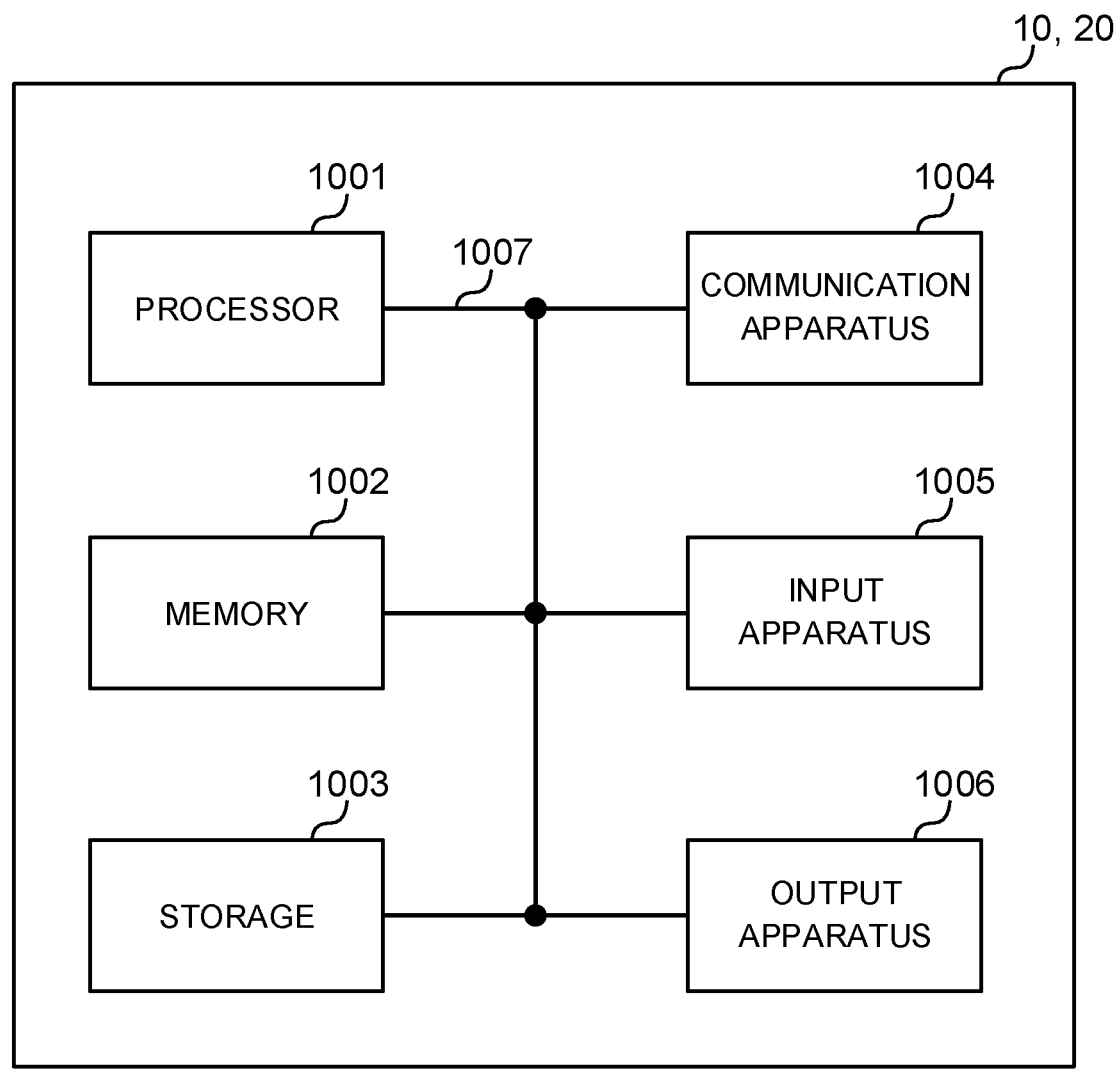
FIG. 9 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 9 is a diagram illustrating one example of the hardware configurations of the radio base station and the user terminal according to the one embodiment of the present invention. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 9 or may be configured without including part of the apparatuses.

For example, FIG. 9 illustrates the only one processor 1001. However, there may be a plurality of processors. Furthermore, processing may be executed by 1 processor or processing may be executed by 1 or more processors concurrently or successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time domain. Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. Furthermore, the RB may include one or a plurality of symbols in the time domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are interchangeably used.

In this description, the terms "Base Station (BS)", "radio base station", "eNB", "gNB", "cell", "sector", "cell group", "carrier" and "component carrier" can be interchangeably used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide a communication service via a base station subsystem (e.g., indoor small base station (RRH. Remote Radio Head)). The term "cell" or "sector" indicates part or the entirety of the coverage area of the base station and/or the base station subsystem that provide a communication service in this coverage.

In this description, the terms "Mobile Station (MS)", "user terminal", "user apparatus (UE: User Equipment)" and "terminal" can be interchangeably used. The base station will be also referred to as a term such as a fixed station, a NodeB, an eNodeB (eNB), an access point, a transmission point, a reception point, a femtocell or a small cell in some cases.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, TMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in this description that, when connected, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description is intended for exemplary explanation, and does not bring any restrictive meaning to the present invention.

The invention claimed is:

1. A terminal comprising:
    a transmitter that transmits demodulation reference signals (DMRSs) of an uplink shared channel; and
    a processor that, if transform precoding is enabled, group hopping is enabled, sequence hopping is disabled, a maximum length of DMRS configured by a higher layer parameter is set to 2, and frequency hopping is not applied,
    then applies a same group hopping parameter to the DMRSs in two symbols of a double-symbol DMRS when a number of symbols for front loaded DMRS is 2, the double-symbol DMRS is indicated by downlink control information, and the DMRSs are arranged on the two symbols.

2. A radio communication method for a terminal, comprising:
    if transform precoding is enabled, group hopping is enabled, sequence hopping is disabled, a maximum length of demodulation reference signal (DMRS) configured by a higher layer parameter is set to 2, and frequency hopping is not applied,
    then applying a same group hopping parameter to DMRSs of an uplink shared channel in two symbols of a double-symbol DMRS when a number of symbols for front loaded DMRS is 2, the double-symbol DMRS is indicated by downlink control information, and the DMRSs are arranged on the two symbols; and
    transmitting the DMRSs.

3. A system comprising a terminal and a base station, wherein:
    the terminal comprises:
        a transmitter that transmits demodulation reference signals (DMRSs) of an uplink shared channel; and
        a processor that, if transform precoding is enabled, group hopping is enabled, sequence hopping is disabled, a maximum length of DMRS configured by a higher layer parameter is set to 2, and frequency hopping is not applied,
        then applies a same group hopping parameter to the DMRSs in two symbols of a double-symbol DMRS when a number of symbols for front loaded DMRS is 2, the double-symbol DMRS is indicated by downlink control information, and the DMRSs are arranged on the two symbols, and
    the base station comprises:
        a receiver that receives the DMRSs of the uplink shared channel.

* * * * *